(12) United States Patent
Feldhaus et al.

(10) Patent No.: US 6,742,412 B2
(45) Date of Patent: Jun. 1, 2004

(54) DRIVE SYSTEM

(75) Inventors: Reinhard Feldhaus, Poppenhausen (DE); Jürgen Weth, Niederwerrn (DE); Bernd Peinemann, Nieerwerrn (DE)

(73) Assignee: Mannesmann Sachs AG, Schweinfurt (DE)

( * ) Notice: Subject to any disclaimer, the term of this patent is extended or adjusted under 35 U.S.C. 154(b) by 3 days.

(21) Appl. No.: 09/989,805

(22) Filed: Nov. 20, 2001

(65) Prior Publication Data

US 2002/0062713 A1 May 30, 2002

(30) Foreign Application Priority Data

Nov. 28, 2000 (DE) .......................... 100 59 101

(51) Int. Cl.⁷ .............................. F16F 15/10; F16H 7/00
(52) U.S. Cl. ........................ 74/574; 474/94; 464/180; 188/378
(58) Field of Search .................. 74/574, 572, 573; 474/87, 94, 150, 161; 464/68, 52, 81, 82, 180; 188/378–379

(56) References Cited

U.S. PATENT DOCUMENTS

| | | | | |
|---|---|---|---|---|
| 2,029,796 A | * | 2/1936 | Salomon | 74/574 |
| 2,346,972 A | * | 4/1944 | Kishline | 74/574 |
| 4,485,906 A | * | 12/1984 | Lutz et al. | 464/24 |
| 5,884,735 A | * | 3/1999 | Eckel et al. | 74/574 |
| 5,976,020 A | * | 11/1999 | Lohaus et al. | 74/574 |
| 6,019,692 A | * | 2/2000 | Kojima et al. | 474/87 |
| 6,345,552 B1 | * | 2/2002 | Rohrig et al. | 74/574 |
| 6,358,153 B1 | * | 3/2002 | Carlson et al. | 464/68 |
| 6,374,698 B1 | * | 4/2002 | Carlson et al. | 74/574 |

FOREIGN PATENT DOCUMENTS

| | | | | |
|---|---|---|---|---|
| DE | 4226116 A1 | * | 2/1994 | 74/574 |
| DE | 4426317 A1 | * | 2/1995 | F16F/15/30 |
| DE | 198 31 159 | | 1/2000 | |
| EP | 0147694 | * | 7/1985 | 74/574 |
| JP | 06-288463 A | * | 10/1994 | F16H/55/38 |
| JP | (P2001-248687) A | * | 9/2001 | F16F/15/14 |

* cited by examiner

Primary Examiner—Marcus Charles
(74) Attorney, Agent, or Firm—Cohen, Pontani, Lieberman & Pavane

(57) ABSTRACT

A drive system that includes a drive shaft, which is or can be brought into torque-transmitting connection with a drive train, a secondary drive system for transmitting torque between the drive shaft and at least one auxiliary unit, and at least one vibration-damping device including a deflection mass carrier with freedom to rotate around a rotational axis and at least one deflection mass, which can shift position relative to the deflection mass carrier in at least one deflection plane. Upon deflection of the at least one deflection mass from the home position relative to the deflection mass carrier, the radial position of the deflection mass changes relative to the rotational axis. At least part of the vibration-damping device can be integrated into part of the secondary drive system.

13 Claims, 8 Drawing Sheets

DRIVE SYSTEM

BACKGROUND OF THE INVENTION

1. Field of the Invention

The present invention pertains to a drive system, comprising a drive shaft, which is or can be brought into torque-transmitting connection with a drive train, and a secondary drive system for transmitting torque between the drive shaft and at least one auxiliary unit. The drive system also includes at least one vibration damping device, which itself comprises a deflection mass carrier with freedom to rotate around a rotational axis and at least one deflection mass, which can shift position relative to the deflection mass carrier in at least one deflection plane. Upon the deflection of the minimum of one deflection mass from a home position with respect to the deflection mass carrier, the radial position of the minimum of one deflection mass changes with respect to the rotational axis.

2. Description of the Related Art

In drive systems of this type, various devices can be used as auxiliary units, including the compressors of air-conditioning systems, cooling fans, d.c. generators, etc. But it is also possible for certain functional areas of the drive system to be driven, as if they were auxiliary units, by the drive shaft itself, such areas including injection pumps or cam drives, which usually include a camshaft. Depending on whether a defined phase relationship between the movement in the auxiliary unit and that of the drive shaft is required, which is the case especially when the above-mentioned injection pump and cam drive systems are involved, or whether only the transmission of torque is required, the connection between the drive shaft and the auxiliary unit can have a greater or lesser degree of stiffness. When a high degree of transmission stiffness is required, spur gears toothed belts or chains can be used to transmit the torque. When a very high degree of transmission stiffness and a very precise phase relationship between the driving and the driven systems are not required, the torque can be transmitted by means of V-belts or timing belts.

It is known that various types of vibrational frequencies occur in systems of this type, in which internal combustion engines are often used as drive units. For example, in the case of four-cylinder, four-stroke engines, the ignition frequency is equal to twice the rpm's of the crankshaft, because two cylinders fire for each revolution of the crankshaft. The situation is similar for injection pump systems. Here, too, two injections occur per revolution of the crankshaft, but they are phase-shifted with respect to the ignition sequence. All these frequencies are transmitted to the auxiliary unit via the more-or-less stiff connection between them. Because, for cost reasons, auxiliary units of this type are usually lighter in weight than the internal combustion engine itself or represent comparatively sensitive systems, the rotational irregularities transmitted to them can cause damage to them or lead to a decrease in their life-span, especially in cases where the connection between the systems is comparatively stiff. The transmission or transfer elements, i.e. V-belts, can also be excessively loaded.

To reduce the transmission of vibrations from the motor to the auxiliary units, it is known that, for example, an elastic coupling can be integrated into the pulleys or wheels of the auxiliary unit driven by a V-belt or a chain to provide for some relative movement between the pulley driven by the belt or chain and the pulley connected to the shaft of the auxiliary unit. The elastic coupling often used for this purpose is effective only for a certain frequency range or at a certain critical natural frequency. It is not possible for such elastic coupling to damp vibrations over a wide range of frequencies.

DE 198 31 159 discloses a system in which the crankshaft, for example of an internal combustion engine, is connected to a pulley. In this area where the crankshaft is connected to the pulley, a so-called speed-adaptive "extinguisher" is also provided, in which the centrifugal forces of various masses change in response to change of rotational speed to help decrease the vibrations. Vibration-damping devices of this type can be tuned to operate at certain frequencies.

SUMMARY OF THE INVENTION

It is the task of the present invention to improve the drive system of the general type in question in such a way that, by means of simple components which occupy little space, vibrations or vibrational excitations (frequencies) can be suitably reduced.

According to the present invention, at least part of the vibration-damping device is integrated into part of the secondary drive system.

As a result of the present invention, a degree of system integration is achieved in which, through the intermeshing of the various system areas, namely, the system area comprising the vibration-damping device and the system area comprising the secondary drive system, various components can assume a double function. This simplifies the design and reduces the size of the machinery, and at the same time it allows the vibrations to be reduced precisely in the area where vibrational excitations are especially critical.

According to an especially preferred aspect of the present invention, it is possible for the secondary drive system to comprise at least one auxiliary drive wheel, which can be rotated by the drive shaft, and for at least part of the vibration-damping device to form at least a part of the auxiliary drive wheel. By allowing the deflection mass carrier to form at least part of the body section of the additional drive wheel, different system areas can be fused both functionally and/or structurally.

Especially when, as discussed above, a defined phase relationship is required between the drive shaft and the secondary or auxiliary unit to be driven by it, it is advantageous for the auxiliary drive wheel to be a gear wheel and for the outer circumference of the deflection mass carrier to be provided with spur gear teeth. As an alternative, it is also possible for the auxiliary drive wheel to be a chain wheel and for the outer circumference of the deflection mass carrier to be provided with teeth.

In an alternative design, it can be provided that the auxiliary drive wheel is a pulley, which has a belt-guiding section on at least one of its axial sides, and that at least one belt-guiding section comprises at least a part of the vibration-damping device. In a variant such as this, the functional or structural system integration or fusion can be achieved easily by providing at least one cover element, which covers a space in which the minimum of one deflection mass is held, on the deflection mass carrier and by designing the minimum of one belt-guiding section to comprise the minimum of one cover element. To provide reliable guidance for the belt which passes over the pulley, it is proposed that two cover elements be provided on the deflection mass carrier and that the two cover elements form two belt-guiding sections.

The degree of system integration can also be increased by designing the auxiliary drive wheel as a pulley with a roll body for the belt and by allowing the belt roll body to form at least part of the vibration-damping device. The deflection mass carrier, for example, can serve as the belt roll body.

Auxiliary units often operate at a speed different from that of the crankshaft. When the auxiliary drive wheel is mounted on a shaft of the auxiliary unit, the speed is often changed by providing the auxiliary drive wheel with an effective radius, i.e., the radius around which a belt or a chain runs, which is smaller than that of the drive pulley. So that sufficient room can be provided for the vibration damping device, however, it is proposed that the minimum of one deflecting mass be mounted in the radial area of or radially outside the effective radial area of the auxiliary drive wheel.

The auxiliary drive wheel can, for example, be rigidly connected to the drive shaft or to an input shaft of the minimum of one auxiliary unit. It is also possible for the auxiliary drive wheel to be a tensioning pulley for an endless transmission element and/or a deflecting pulley for an endless transmission element, which is mounted rotatably on a suitable support. In an arrangement such as this, the deflection mass carrier can be mounted rotatably on the support by way of a bearing arrangement.

Various designs are known for these types of vibration-damping devices or "extinguishers", the damping characteristics of which adapt to the rotational speed. For example, it is possible for the minimum of one deflection mass to be connected to the deflecting mass carrier by at least two connecting areas a certain distance laterally apart so that the mass has a certain freedom of movement with respect to the carrier. Each connecting area in the deflection mass carrier has a first guide path arrangement with a summit area on the radially outward side, whereas the deflection mass has a second guide path arrangement with a summit area on the radially inward side and a connecting bolt, which is guided by and free to move along the first and second guide path arrangements.

In an alternative design variant, a deflection path assigned to the minimum of one deflecting mass can be provided on the deflection mass carrier, along which path an outside circumferential surface of the minimum of one deflecting mass can move, preferably with a rolling motion. The deflecting path has a summit area on the radially outward side and deflecting areas which extend out from this summit area, the radial distance of these deflection areas from the rotational axis decreasing with increasing distance from the summit area.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
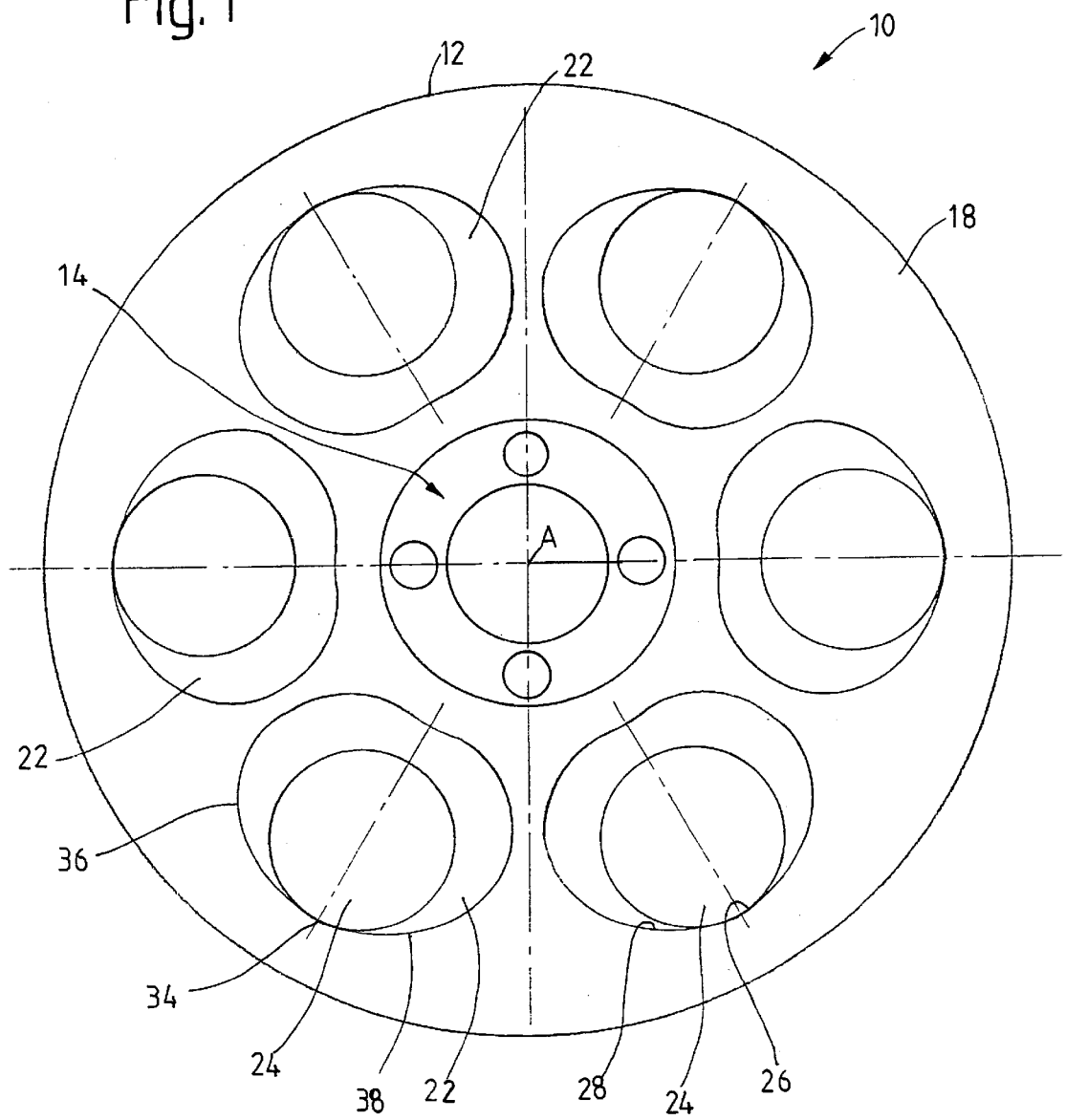
FIG. 1 is a schematic diagram, viewed from the in axial direction, of a vibration-damping device according to the principles of the invention.

Referring to FIG. 1, there is illustrated a vibration-damping having several deflection masses moving along deflection paths. The vibration-damping device 10 comprises a deflection mass carrier 12 having a radially inner area 14 which can be connected to a shaft for rotation around rotational axis A. Several free spaces 22, distributed in the circumferential direction around the rotational axis A, are provided in a body part 18 of the deflection mass carrier 12 where each free space 22 is adapted to accept one deflection mass 24. The surface area 26 of the body part 18 forming the outside radial boundary of the free space 22 forms a deflection path 28 for the deflection mass 24 held in the associated free space 22. The axial dimension of the free spaces 22 can be substantially the same as the thickness of the disk-like or cylindrical deflection mass 24.

As illustrated in FIG. 1, the deflection paths 28 are designed to provide a summit area 34, which is the area of the deflection path at the greatest radial distance from the rotational axis A. Proceeding in the circumferential direction from this summit area 34 are deflection areas 36, 38, the radial distance of which from the rotational axis A decreases with increasing distance from the summit area. Deflection areas 36, 38 are configured in such a way that, as the deflection masses execute a rolling motion along the deflection paths 28, the centers of gravity of the individual deflection masses 24 trace a curve here illustrated as being epicycloid. The natural vibration frequency thus obtained from this vibration system formed out of the individual deflection masses 24 is therefore essentially independent of the vibration amplitude.

In a vibration-damping device of this type, it is possible to implement various changes without deviating from the underlying functional principle. For example, the free spaces 22 can be connected to each other; that is, the ends of the various deflection paths can be connected to each other, in which case stops or the like would be provided to ensure that an individual deflection mass 24 is able to move only along the deflection path 28 specifically assigned to it. The free spaces 22 are preferably closed off by cover elements on both axial sides. A design is also possible in principle in which each deflection mass 24 consists of parts, one on each side of the body part 18, the two parts being permanently connected to each other by a connecting member such as a pin, shaft or the like. It is this connecting member which extends through the free spaces 22 and rolls along the deflection path 26.

When vibrations or rotational irregularities or oscillations occur during rotational operation, the deflection masses 24 are shifted in the circumferential direction with respect to the deflection mass carrier 12 and roll along their associated deflection paths 26. This movement, however, also leads to a forced movement of the deflection masses 24 radially toward the rotational axis A, because the radial distance of the deflection path sections 36, 38 from the rotational axis A decreases with increasing distance from the summit area 34. As a result of this movement in opposition to the centrifugal force, an oscillator is created, which, through the selection of the contour or curvature of the path and through the selection of the mass of the deflection masses 24, can be designed to damp or extinguish a specific frequency. By providing the deflection masses with different path contours and/or the various deflection masses with different weights, it is possible to tune the system to damp or extinguished different frequencies.

Figure 2:
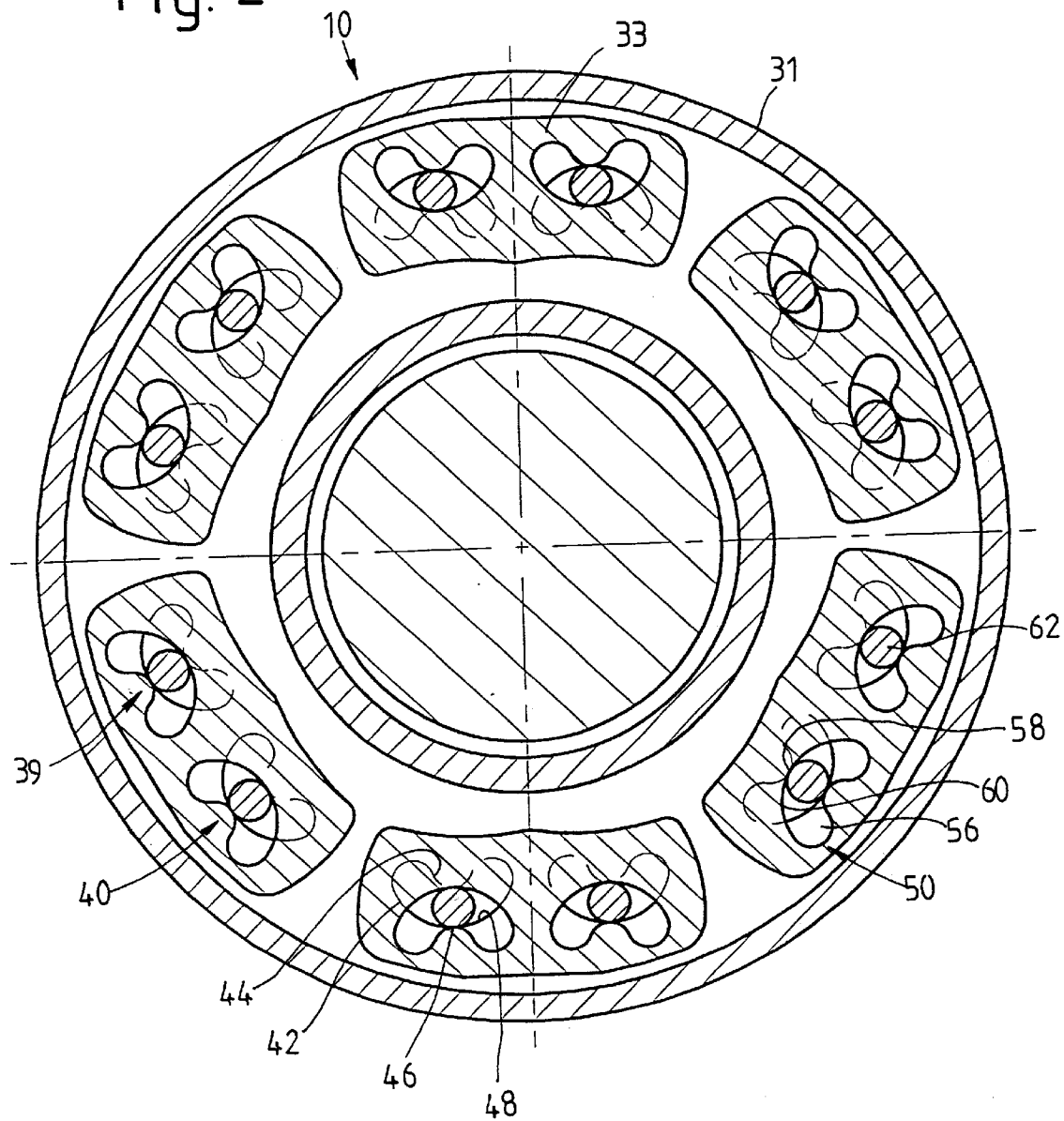
FIG. 2 is an axial view similar to that of FIG. 1, which shows an alternative design of the vibration-damping device.

FIG. 2 shows an alternative design of a vibration-damping device 10, which makes use of the same physical aspects to reduce vibrations or oscillations. In FIG. 2, a deflection mass carrier 31 supports a plurality of deflection masses 33, distributed around it in the circumferential direction.

As illustrated in FIG. 2, each deflection mass 33 is supported by two connecting areas 39, 40 so that it is free to move with respect to the deflection mass carrier 31. The two connecting areas 39, 40 are similar and, therefore, reference made to connecting area 39 also applies to connecting area 40.

Connecting area 39 comprises a first guide path arrangement 42 in the deflection mass carrier 31. This guide path arrangement 42 is formed essentially by a curved opening 44, which passes axially through the deflection mass carrier 31 and which has a summit area 46 on the radially outward side. A guide path 48 is formed on a surface facing toward the inside.

In association with each first guide path arrangement 42, a second guide path arrangement 50 is provided in the deflection masses 33. Each guide path arrangement 50 comprises an opening 56, formed in each of the deflection masses 33, each of these openings having a summit area 58 on the radially inward side, so that a radially outward-facing surface provides a guide path 60. Connecting bolts 62 are inserted through the openings 56 in the deflection masses 33 and the associated openings 44 in the deflection mass carrier 31, which bolts ultimately, are able to move along the two guide paths 48, 60. Openings 44, 56 are designed with a width—extending in their lengthwise direction—such that the connecting bolt or bolts 62 are held or guided in the associated openings 44, 56 with essentially no clearance.

The deflection masses 33 can be located between two cover areas of the deflection mass carrier 31, in which case there would be a first guide path arrangement on each side of the deflection mass 33. An arrangement is also possible in which each deflection mass 33 consists of two parts, one on each side of the deflection mass carrier 31. A second guide path arrangement 50 or a part of a second guide path arrangement would then be provided in each part of the deflection mass.

When vibrations or rotational irregularities or oscillations occur in rotational operation, the deflection masses 33 shift in the circumferential direction with respect to the deflection mass carrier 31. This displacement, however, will necessarily lead to the movement of the deflection masses 33 in the radially inward direction, because, during this circumferential displacement, the connecting members 62 of all the connecting areas 39, 40 approach the ends of the guide paths 48, 60, which curve in opposite directions. As a result of this movement in opposition to the centrifugal force of the centrifugal potential system, an oscillation is created, which, through the selection of the contour or curvature of the paths and through the selection of the weights of the deflection masses 33 can be tuned to damp or extinguish a specific frequency or oscillation. By providing certain deflection masses with different path contours and/or by providing certain deflection masses with different weights, it is possible to tune the system to damp different frequencies or oscillations.

The vibration-damping devices described above can be incorporated into a drive system in such a way that the occurrence of rotational irregularities or oscillation can be partially or completely prevented in the drives of auxiliary units such as compressors for air-conditioning systems, water pumps, cooling fans, injection pumps, cam drives, etc.

Figure 10:
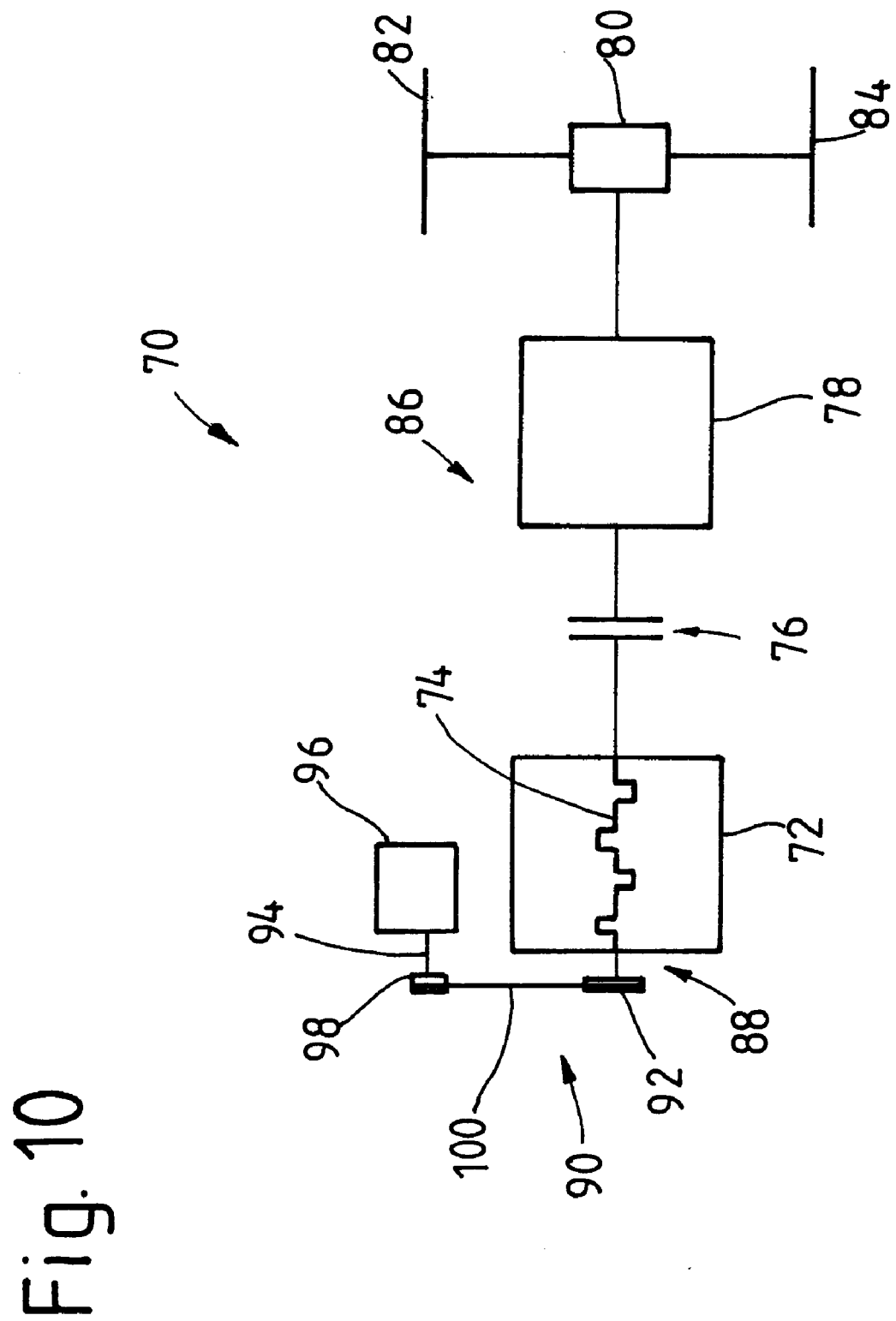
FIG. 10 is a schematic diagram of a drive system embodying the present invention.

Referring to FIG. 10, there is illustrated as schematic diagram of a drive system 70 embodying the present invention. The system comprises an internal combustion engine 72 as the drive unit; the drive shaft or crankshaft 74 of the engine can drive the driving wheels 82, 84 of a vehicle via a clutch arrangement 76, a transmission arrangement 78, and a differential 80. The components and shaft sections following after the drive shaft 74 ultimately form a drive train 86. On the secondary takeoff side, i.e., for example, the forward end 88 of the internal combustion engine 72, the drive shaft 74 is connected to an auxiliary drive system 90. This comprises, for example, a first auxiliary drive wheel 92 on the drive shaft 74. The auxiliary drive wheel 92 be a pulley, for example. The auxiliary system also comprises a second or driven auxiliary drive wheel 98, mounted on a shaft 94 of an auxiliary unit 96. The two wheels 92, 98 can be connected to each other by an endless transmission element 100 such as a V-belt or a timing belt, a chain, etc., to transmit the torque.

Referring to FIGS. 3–9, various design variants illustrate how the vibration-damping devices described in FIGS. 1 and 2 can be integrated into an auxiliary drive system 90 such as the one illustrated in FIG. 10.

Figure 3:
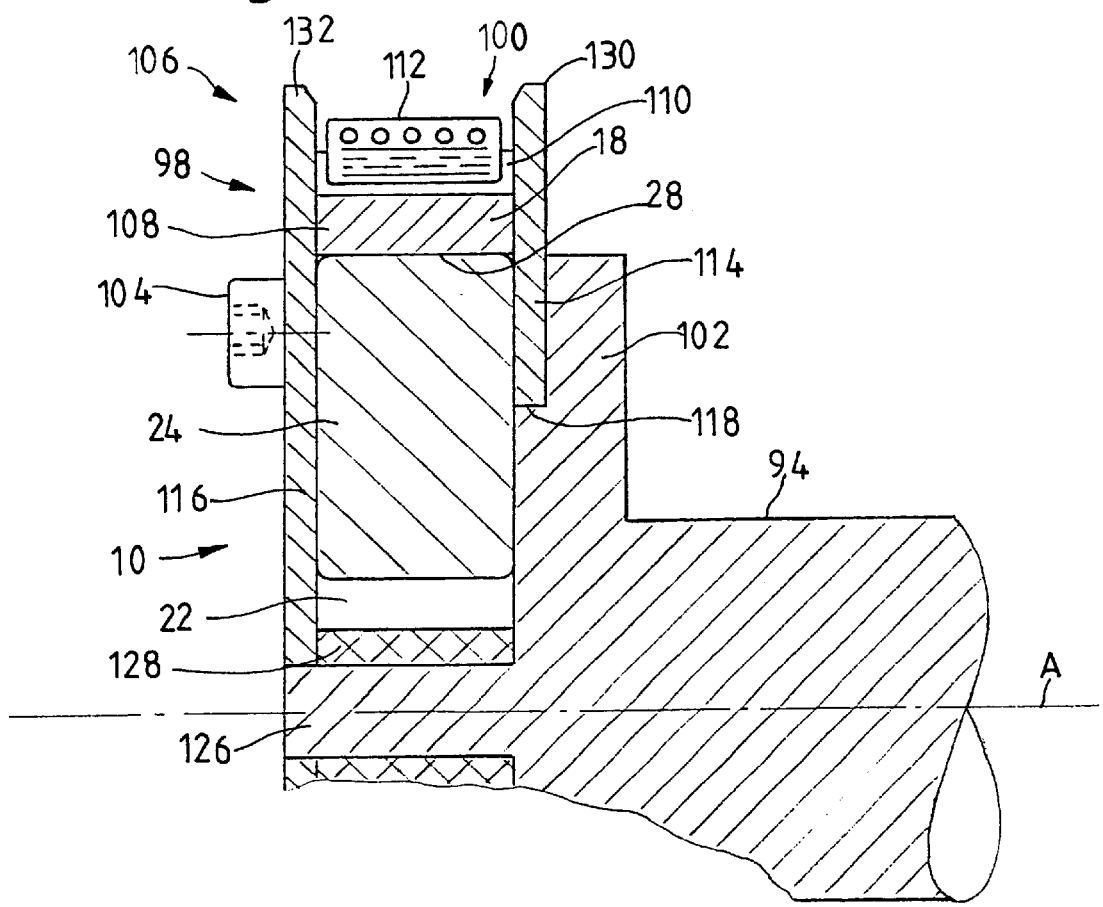
FIG. 3 is a partial longitudinal section of an auxiliary unit, in which the vibration-damping device has been provided.
Figure 4:
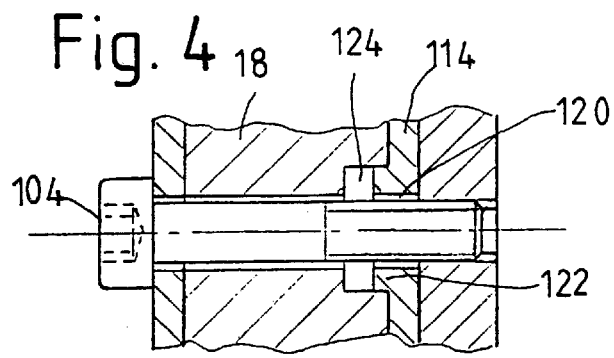
FIG. 4 is a detailed drawing, which illustrates how the various system components of the embodiment according to FIG. 3 are connected to each other.

Referring to FIGS. 3 and 4, the driven auxiliary drive wheel 98 is connected to the shaft 94 of an auxiliary drive unit. The shaft 94 has a flange-like, expanded area 102. The auxiliary drive wheel 98, which in this case forms a pulley 106, is attached to expanded area 102 by a plurality of threaded bolts 104 (see FIG. 4). The vibration-damping device 10, the functional principle and basic design of which have been described above with reference to FIG. 1, is integrated into auxiliary drive wheel 98, i.e., into the pulley 106. The vibration-damping device 10 comprises the body part 18 as the deflection mass carrier, in which the free spaces 22 are formed. These spaces are bounded radially toward the outside by the deflection paths 28 for the deflection masses 24. The body part 18 simultaneously forms a body section 108 of the pulley 106, the outside circumferential area of which is provided with indentations 110 to receive with a timing belt 112, which functions as an endless transmission element 100. Cover elements 114, 116 are provided on each axial side of the body part 18, i.e., of the body section 108. The cover element 114 is centered on the flange-like section 102 or on a shoulder 118 of the section. As can be seen in FIG. 4, a pass-through opening 120 is provided in the cover element 114, through which the threaded bolt 104 can be inserted. To center the body part 18, the cover element 114 has a centering projection 122 in the area of each pass-through opening 120, each of which fits into a corresponding centering hole 124 in the body part 18. The threaded bolts 104 hold the two cover elements 114, 116 on the body 118 and at the same time fasten this assembly to the shaft 94.

To facilitate assembly the cover elements 114, 116 can be preassembled or permanently combined with the body part 18 by means of, for example, individual welding spots or by separate connecting elements such as rivets or stud bolts.

In the radially inner area, an elastic sleeve 128 is mounted on axial shoulder 126 of shaft 94. Sleeve 128 closes off free spaces 22, which are open on the radially inward side. This provides the deflection masses 24 with an elastic stop, which is useful during starting and stopping. It is here noted that the free spaces 22 do not have to be designed as shown in FIG. 1, where they are separate from each other. The free spaces 22 can communicate with each other in the circumferential direction, so that ultimately the various deflection paths 28 are also connected to each other. In this way, therefore, it is possible to increase the surface area provided for the deflection paths.

In their radially outer area, the two cover elements 114, 116 project beyond the expanded area 102 and indentations 110 to form guide sections 130, 132 for the timing belt 112.

When rotational irregularities or oscillations occur, such as those induced by the ignition sequence or the injection sequence, and these irregularities or oscillations are transmitted from the drive shaft or crankshaft 74 via the timing belt 112 to the area of the pulley 106, the deflection masses 28, which are basically being pulled radially outward by centrifugal force, are urged to roll along their deflection paths 28. This rolling motion is accompanied by a reduction in their radial distance from the rotational axis A, so that an opposing vibrational system is created, which contributes to fully or partially damping the rotational irregularities or oscillations. A significant advantage obtained with this embodiment of having the vibration-damping device 10 integrated both functionally and structurally into the auxiliary drive wheel 98, i.e., into the pulley 106, is that no additional space is required to accommodate the vibration-damping device 10. Another significant advantage is that the vibrations which occur are reduced in the area where they are especially critical, that is, in the area of the auxiliary unit.

These types of auxiliary units usually require a rotational speed that is different from than that of the drive shaft 74. In many instances, the speed of the auxiliary units must be increased. Thus, the effective diameter of the pulley 106 shown in FIG. 3 must be smaller than the effective diameter of the disk 92 provided on the drive shaft 74. When the vibration-damping characteristic of the vibration-damping device 10 installed in the area of the auxiliary unit is tuned, it is also necessary to take into account the speed ratio of the drive shaft 74 relative to the driven shaft 94. Especially when a certain order of frequency relative to the speed of the drive shaft is critical, e.g., second-order frequency in the case of a four-cylinder, four-stroke engine, the order to which the vibration-damping device 10 is to be tuned is determined by dividing the critical frequency order by the speed ratio i, which is defined ultimately as the ratio of the speed of the driven pulley, for example, of the pulley 106, to the speed of the drive shaft 74. It follows from this that, for example, when the second order frequency is especially critical in the area of the drive shaft 74 and the speed ratio between the pulley and the drive shaft is 2 (i=2), the vibration-damping device 10 should be tuned to the first order frequency. It can be seen from this that, when the speed ratio is designed to increase the speed of the pulley, that is, when i is greater than 1, the frequency resulting from the basic design of the system will be lower than it would be if the vibration-damping device 10 were mounted directly on the drive shaft 74. Tuning to a lower frequency, however, makes it necessary or possible, for example, to lay out the deflection paths 28 with a flatter curvature, which is advantageous with respect to the vibration-damping characteristic obtained. In a complete system in which several auxiliary units must be driven, it is then possible, for example, to provide a vibration-damping device in the area of the auxiliary unit which can be tuned to the lowest frequency because this is where the highest speed ratio is present, with the result that optimized damping behavior is obtained. Obviously, it would also be possible to provide vibration-damping devices in the area of the other auxiliary units as well, in which case the devices would be tuned to the frequency derived from the specific speed ratio of the auxiliary unit in question.

The procedure described above for tuning the vibration-damping device 10 such as that described in conjunction with FIGS. 1 and 2 also applies to all the design variants to be described below, in which a specific speed-increasing or speed-decreasing ratio is also present between the drive shaft 74 and the driven shaft or the shaft to be driven 94.

Figure 5:
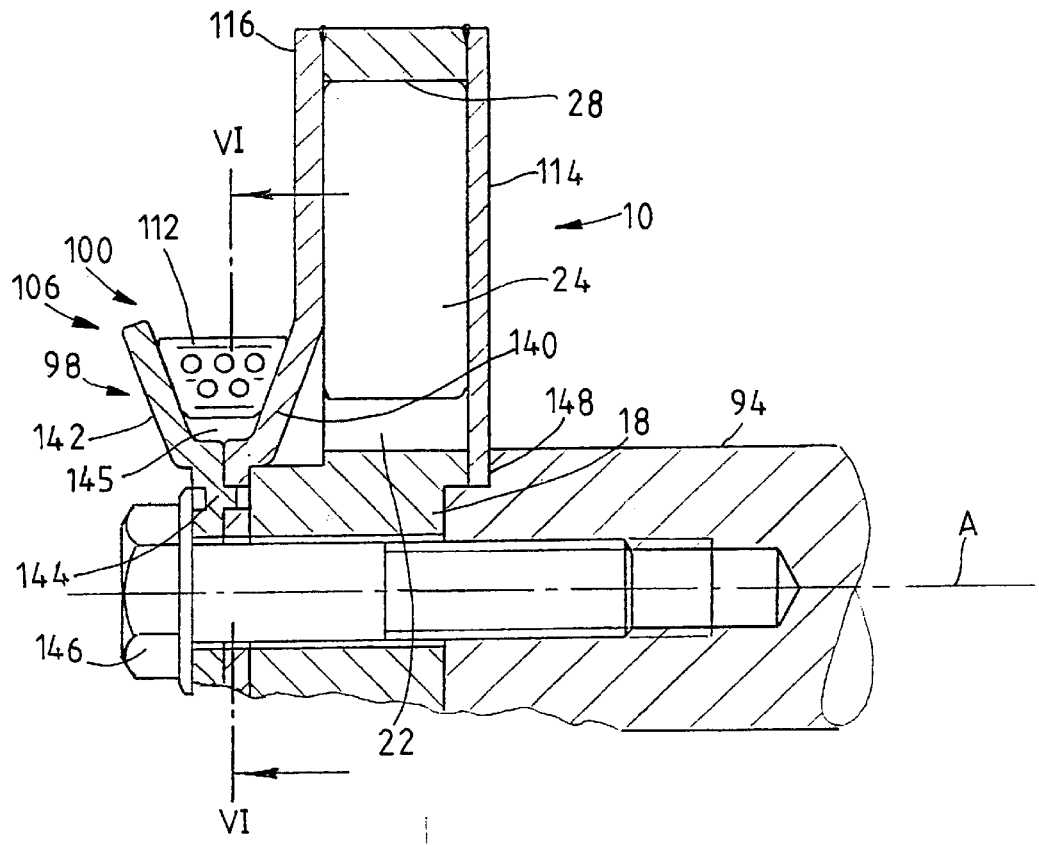
FIG. 5 is an alternative design of the combination of an auxiliary unit with the vibration-damping device.

The vibration-damping device 10 can also be structurally integrated into the secondary drive system 90 shown in the embodiment according to FIG. 5. It can be seen here that the radially inner area of the cover element 116 forms a component of the pulley 106. This pulley 106 comprises essentially two parts, namely, the radially inner area 140 of the cover element 116 and a second disk part 142. In the area where these two parts face each other in the axial direction and where they cooperate with a V-belt 112, serving as an endless transmission element 100, they extend radially outward and apart from each other, so that the pretension of the V-belt also helps to pull the belt into the resulting key-shaped circumferential groove 145. The belt and the pulley thus work together. The two parts 142, 116 can be connected nonrotatably to each other at their radially inner areas, where they rest against each other, by raised areas 144. A central fastening screw 146 passes through the two parts 142, 116 and also through the radially inner area of the body part 18 and is screwed into the axial end of the shaft 94. The cover element 114 is clamped between the body part 18 of the vibration-damping device 10 and a radial shoulder 148 of the shaft 94. It can also be seen that, in the radially outer area, the body part 18, which forms essentially the deflection mass carrier, can be connected to the two cover elements 114, 116 by welding.

Figure 6:
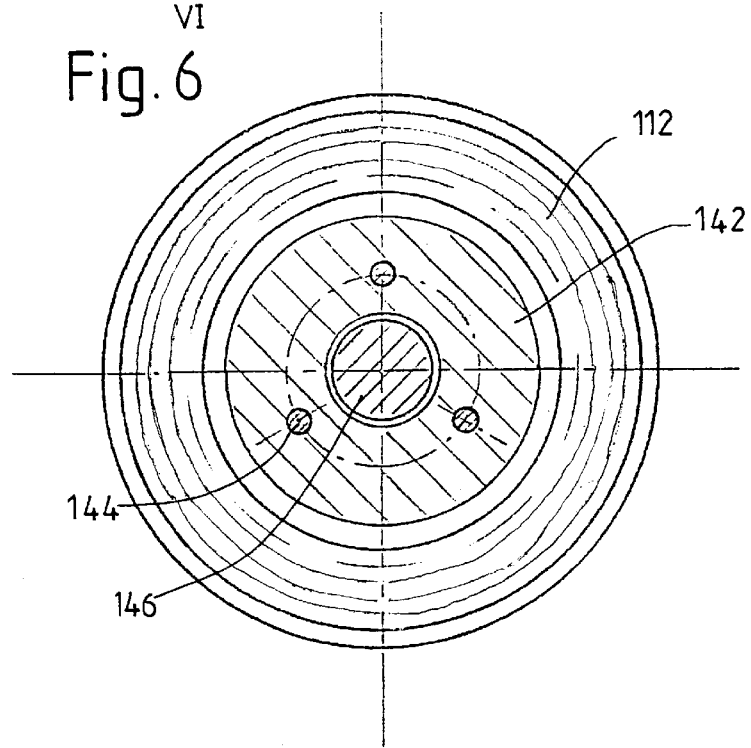
FIG. 6 is a sectional view along line VI—VI of FIG. 5.

An essential advantage or aspect of the design shown in FIGS. 5 and 6 is that the pulley 106 can have a relatively small effective diameter, whereas a much larger amount of radial space is available for the vibration-damping device 10, which is integrated structurally, although with an axial offset, into the pulley 106. This extra space is advantageous especially with respect to the design of the deflection paths 28, because the greater radial distance between the paths and the rotational axis A makes it possible to improve the vibration-damping behavior considerably. This embodiment, especially in conjunction with the possibility of a relatively large radial dimension of the vibration-damping device 10, allows advantage to be taken when the individual free spaces 22 of the deflection masses 24 pass continuously into one another in the manner described above, with the result that relatively long but only slightly curved paths can be provided, whereas the number of deflection paths can be comparatively large, a feature which is especially useful in a design intended to deal with low orders of frequencies.

Figure 7:
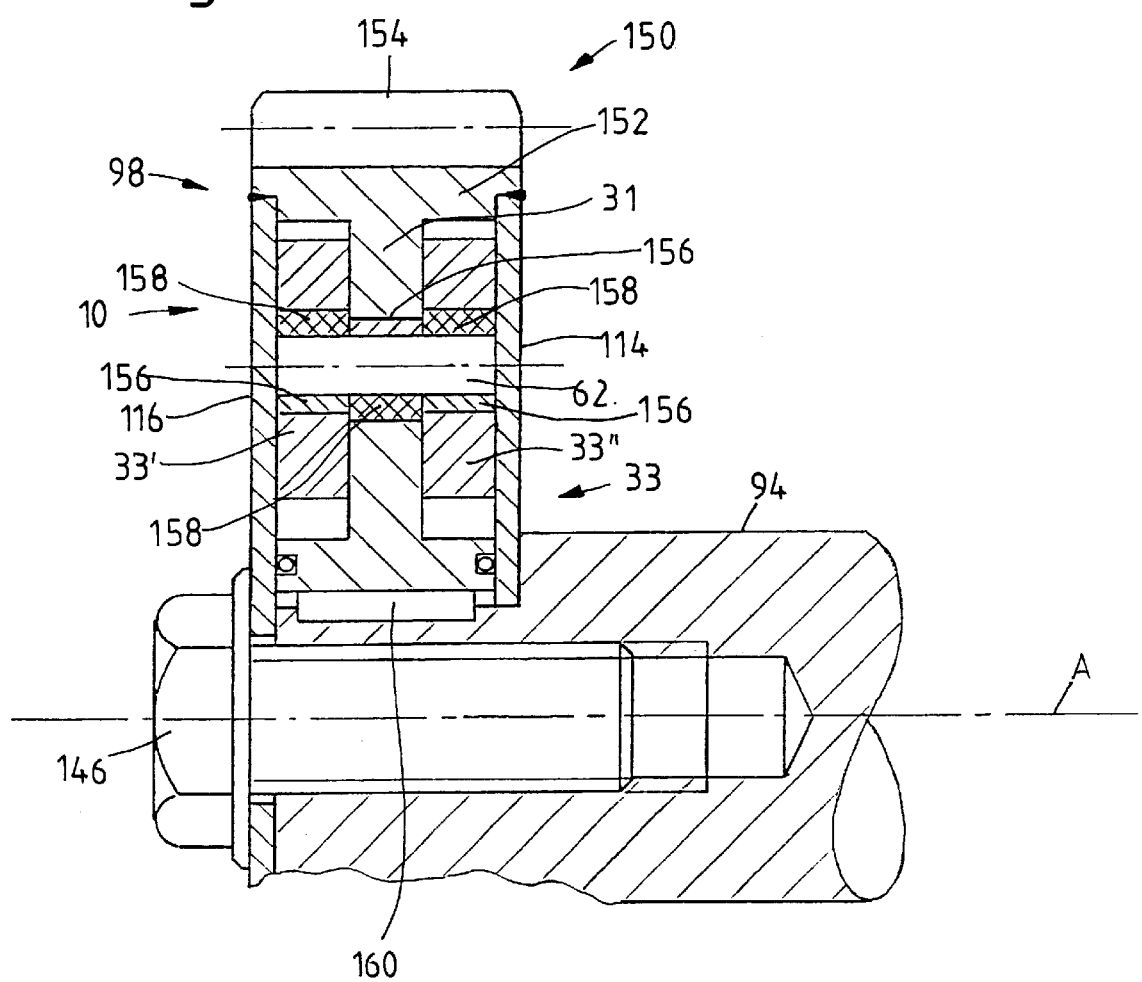
FIG. 7 is another partial axial view of an auxiliary unit in combination with the vibration-damping device.

In the case of the design shown in FIG. 7, a gear wheel 150 is connected nonrotatably to the shaft 94 of an auxiliary unit 96 to serve as an auxiliary drive wheel 98. A vibration-damping device 10 such as that described above on the basis of FIG. 2 is integrated into this gear wheel 150. It can be seen here in longitudinal section that the deflection mass carrier 31 is designed with a double-T configuration and ultimately forms a body section 152 of the gear wheel, which carries a set of spur gear teeth 154 on the radially outer side. The two mass parts 33', 33" of the deflection mass 33 in question are mounted on the sides of the deflection mass carrier 31; in each of the mass parts 33', 33", guide path arrangements 50 or sections of such paths as described above are provided, and, of course, a guide path arrangement 42 for each of the connecting areas 39, 40, is also provided in the deflection mass carrier 31. The more heavily loaded areas of the guide paths can in this case be formed by, for example, inserts 156, installed in the appropriate openings; these inserts can consist, for example, of hardened plate elements or some other type of wear-reducing or wear-resistant parts. On the opposite sides of the openings holding the connecting members 62, elastic materials 158 can be provided to avoid the occurrence of impact and impact noises during transitions to the starting or stopping state.

To hold the individual mass parts 33', 33" of the associated connecting member 62 together with the deflection mass carrier 31 as a single assembly, cover elements 114, 116 are provided, one on each axial side; the radially outer area of these cover elements can be welded, for example, to the deflection mass carrier 31, and their radially inner areas can rest against the carrier via O-ring-like sealing elements. Thus, tightly sealed chambers are provided for the mass parts 33', 33" of the deflection masses 33, so that, for example, a fluid can be introduced into these chambers to provide an additional damping function, such as a lubricating function for loaded components, which opposes the deflecting movement of the deflection masses 33. A fluid of this kind can also be introduced in the other design variants described above and also in those that are described below. The auxiliary gear wheel 98 incorporating the vibration-damping device 10 is attached to the shaft 94 by a central fastening screw 146, which has the result that the two cover elements 114, 116 are essentially clamped together with the radially inner area of the deflection mass carrier 31 being located between them.

The design shown in FIG. 7 is advantageous especially when the drive torque acting on the auxiliary unit 96 is to be transmitted with high precision of the phase relationship between the drive shaft 74 and the shaft 94 of the auxiliary unit 96. This is necessary, for example, for the drive of injection pumps or for the actuation of cam drives, because these systems must always act in a defined relationship with the rotational position of the crankshaft or drive shaft 74. The use of a gear wheel drive, in which the auxiliary drive wheel 92 is provided with a set of spur gear teeth and is attached to the drive shaft 74, ensures that the torque will be transmitted with essentially no slip and with essentially no lag. Of course, the speed-increasing or speed-decreasing ratio described above plays a significant role here, too, with respect to the turning of the guide path arrangements and the selection of the weights of the various deflection masses 33. It should also be pointed out that, to produce a shaft-hub connection, a fitted key 160 can be provided, by means of which the deflection mass carrier 31, which ultimately forms the body section 152 of the gear wheel 150, is connected to the shaft 94.

Figure 8:
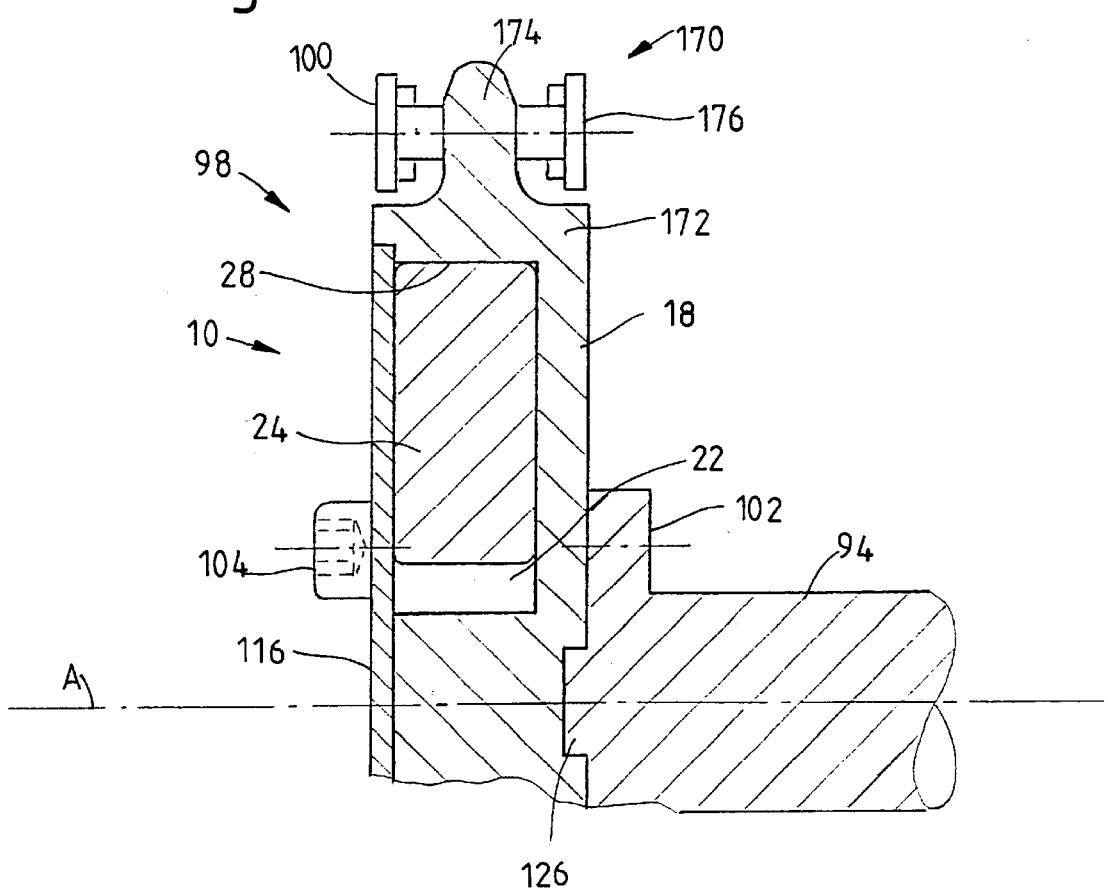
FIG. 8 is another partial axial view of an auxiliary unit in combination with the vibration-damping device.

FIG. 8 shows a design in which a pinion 170 which functions as an auxiliary drive wheel 98 is connected to the shaft 94 of the auxiliary unit. The body section 172 of the pinion 170 is formed by the body part 18, i.e., the deflection mass carrier 18, of the vibration-damping device 10 shown in FIG. 1. The radially outer area of this body section has a set of gear teeth 174, on which a transmission chain 176 runs as an endless transmission element 100. The free spaces 22 for the deflection masses 24 are closed off on one side by the body part 18. On the other axial side, a cover element 116 is provided, this cover element 116 being attached to the body part 18. The assembly of these two parts is attached to the flange area 102 of the shaft 94 by threaded bolts 104. In the radially outer area, the cover element 116 can be permanently fastened to the body part 18 by welding or by additional screws or rivets. Pinion 170 is centered on the shaft 94 by an axial shoulder 126.

Figure 9:
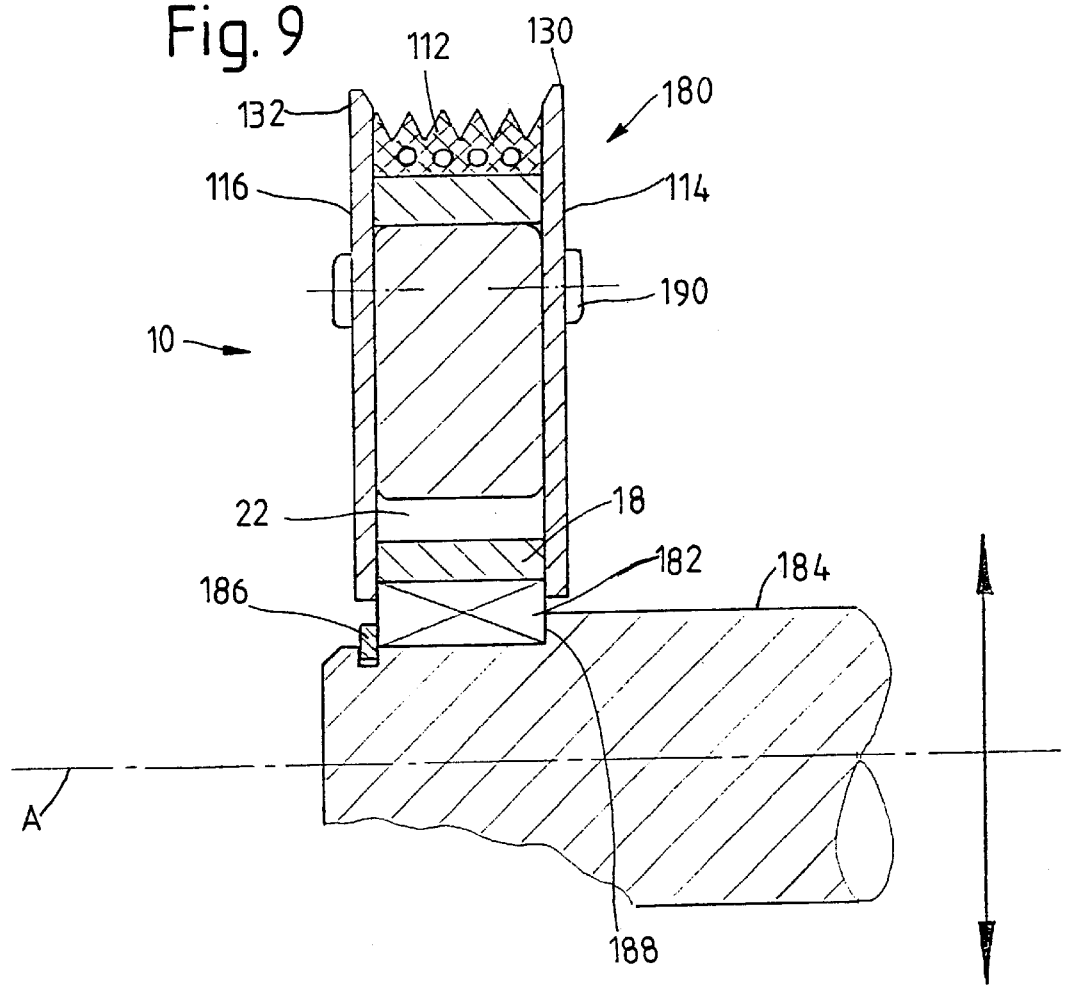
FIG. 9 shows the use of a vibration-damping device in a drive system for an auxiliary unit in the area of a deflecting or tensioning pulley.

FIG. 9 illustrates a design in which the vibration-damping device 10 is integrated into a deflecting or tensioning pulley 180 of the auxiliary drive system 90. The deflection mass carrier or body part 18 with the free spaces 22 is supported rotatably at its radially inner area by a bearing, such as a roller bearing 182 or the like, on an axle 184. A locking ring 186 and a radial shoulder 188 of the axle 184, which acts as the support, secure the bearing 182 in its axial position. To tighten an endless transmission element 100, such as a belt 112, which runs over the outer circumferential area of the body part 18, the axle, i.e., the support 184, can be moved at a right angle to its rotational axis, i.e., to the rotational axis A of the deflecting or tensioning pulley 180.

Cover elements 114, 116 are again provided on both axial sides of the body part 18; this assembly being held together by rivets or stud bolts 190. Guide sections 130, 132 of the cover elements 114, 116 again project radially outward beyond the deflection mass carrier, i.e., body part 18, and thus provide lateral guidance for the endless transmission element.

It is also to be noted that the support 184 can be integrated into an elastic damping device, i.e., can therefore be elastically suspended, so that an additional damping function can be provided. Basically, however, the provision of the vibration-damping device 10 provides an excellent damping characteristic, which is tuned to a specific order of frequency over the entire range of rpm's.

In all of the designs described above, use is made of the fact that a vibration-damping device which allows tuning to a specific frequency or range of frequencies is integrated functionally and structurally into an auxiliary unit drive. It is especially advantageous that the inventive device can be integrated into the area of the auxiliary drive unit itself, for example, into the area of a driven pulley, a driven gear wheel, or pinion and thus, elimination or decrease the vibrational frequency at a place where it could lead to damage over the long term.

It is here noted that either embodiment of the vibration-damping device 10 described in relation to FIGS. 1 and 2 can be used in any of the other designs described above. The parts of the vibration-damping device used in the various embodiment are, for cost reasons, preferably designed as metal plate parts. Such parts include those in the area of the cover elements, and in the area of the deflection mass carrier or body part, into which the free spaces can be introduced by punching. The body part or the deflection mass carrier could also be designed as a solid component, which is then subjected to appropriate metal-removing procedures to arrive at the final shape. The present invention also makes provision for the possibility that the vibration-damping device here disclosed can be integrated into each of the wheels 92, 98 shown in FIG. 10, for example, and also into the auxiliary drive wheels of yet other auxiliary units. The case of a vibration-damping device 10 has a positive effect not only on the auxiliary unit combined with it but also on the drive train 86.

It is also possible within the scope of the present invention to make use of the damping function of elastic damping elements in addition to the damping or extinguishing function induced by the movement of deflection masses. For example, elasticities, such as those provided by layers of elastomeric material between two ring-shaped areas or possibly between spring-type elements in the manner of dual-mass flywheels can also be introduced, for example, in the area of the various wheels illustrated in the path of torque transmission. In particular, such layers of elastomeric material can be installed between the deflection mass carrier and the ring-shaped component over which an endless transmission element runs. An elastomeric layer of this type can, for example, be bonded in place by vulcanization. As discussed, it is also possible to influence the vibration-damping characteristic by introducing a fluid into the various free spaces, which thus damps the movement of the individual deflection masses. The spaces can be easily sealed in such designs by the introduction of sealing elements such as those shown in particular in FIG. 7. Solid-to-solid friction can also be provided by clamping the deflection masses gently between the two cover elements. It is advantageous in all the embodiments, as already described above with reference to FIG. 7, to use wear-reducing components on the more heavily loaded contact surface areas along which the deflection masses or connecting members move or to produce these from wear-reducing or wear-resistant materials. Here, too, it is possible to influence the damping characteristic by providing comparatively high coefficients of sliding or rolling friction in the surface areas which interact with each other. The use of wear-reducing or friction-reducing or possibly even friction-increasing surface areas can also be advantageous in the area of the cover elements which close off the axial ends of the various free spaces to the extent that, as a result, first, it is possible to exert an influence on the wear which occurs during operation and, second, to exert an influence on the damping characteristic.

In all of the embodiments of the invention, the achieved functional and structural integration makes it possible to arrive not only at a significant reduction or elimination of vibrations and/or oscillations in the area of the auxiliary units over an entire range of speeds but also at a significant reduction in cost and a decrease in the construction space which must be made available. Because, when the device according to the invention is used, there is little or no need for any additional elastic damping, undesirable shifts in the phase relationship between the drive shaft on the one hand and the driven unit such as a cam drive or an injection pump on the other can be avoided, with the result that a system designed in accordance with the invention can operate with a much higher degree of precision.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A drive system comprising
   a drive shaft which can be brought into torque-transmitting connection with a drive train,
   a secondary drive system for transmitting torque between the drive shaft and at least one auxiliary unit, said secondary drive system comprising an auxiliary drive wheel coupled to be rotated by said drive shaft, said auxiliary drive wheel comprising a pulley having a pair of belt guide sections.
   a vibration damping device comprising a deflection mass carrier with freedom to rotate about a rotational axis, said deflection mass carrier forming part of the auxiliary drive wheel, said deflection mass carrier having axially opposed sides and at least one free space extending between said sides, said device further comprising at least one deflection mass in each said at least one free space, wherein each said deflection mass can shift with respect to the deflection mass carrier in at least one deflection plane so that the radial position of the deflection mass with respect to said axis changes, at least part of said vibration damping device being integrated into said secondary drive system, and
   a pair of cover elements assembled to respective said sides of said deflection mass carrier and covering said at least one free space, said cover elements forming the belt guide sections of the pulley.

2. The drive system of claim 1, wherein the auxiliary drive wheel comprises a body section, and the deflection mass carrier forms at least a part of the body section.

3. The drive system of claim 2, wherein the auxiliary drive wheel is a gear wheel, and the deflection mass carrier has an outer circumferential area which supports a set of gear teeth.

4. The drive system of claim 1, wherein the auxiliary drive wheel is a pulley with a belt roll body, wherein the belt roll body comprises at least part of the vibration-damping device.

5. The drive system of claim 4, wherein the belt roll body comprises the deflection mass carrier.

6. The drive system of claim 1, wherein the at least one deflection mass is located in one of a radial area of the auxiliary drive wheel and radially outside the effective radial area of the wheel.

7. The drive system of claim 1, wherein the auxiliary drive wheel is rigidly coupled to a drive shaft of the at least one auxiliary unit.

8. The drive system of claim 1, wherein the auxiliary drive wheel forms an endless transmission element tensioning pulley mounted rotatably on a support.

9. The drive system of claim 1, wherein the at least one deflection mass is coupled to the deflection mass carrier at at least two connecting areas laterally spaced apart and has a fixed degree of freedom of movement relative to the carrier, wherein each connecting area has a first guide path having a radially outward-located summit area and a second guide path having a radially inward-located summit area, and a connecting bolt slidably guided on the first guide path and on the second guide path with freedom to move along these paths.

10. The drive system of claim 1, wherein a deflection path is coupled to the deflection mass carrier, along which path the deflection mass can move, while executing a rolling movement, where the deflection path has a summit area on a radially outward side, and deflection areas which extend from the summit area, the radial distance of which from the rotational axis decreases with increasing distance from the summit area.

11. A drive system as in claim 1 further comprising a pulley which is coaxial with said deflection mass carrier, said pulley comprising a pair of belt guides, at least one of said cover elements forming a respective at least one of said belt guides.

12. A drive system as in claim 1 wherein said deflection mass carrier has a centering hole in at least one of said sides, and at least one of said cover elements has a centering projection which is received in a respective said hole to center said at least one cover with respect to said deflection mass carrier.

13. A drive system as in claim 1 comprising a plurality of free spaces and a plurality of said deflection masses, each said free space receiving only one said deflection mass.

* * * * *